United States Patent
Saha

(10) Patent No.: US 10,144,172 B2
(45) Date of Patent: Dec. 4, 2018

(54) METHOD TO SUPPRESS PERIOD DOUBLING DURING MANUFACTURE OF MICRO AND NANO SCALE WRINKLED STRUCTURES

(71) Applicant: Sourabh Kumar Saha, Livermore, CA (US)

(72) Inventor: Sourabh Kumar Saha, Livermore, CA (US)

( * ) Notice: Subject to any disclaimer, the term of this patent is extended or adjusted under 35 U.S.C. 154(b) by 179 days.

(21) Appl. No.: 15/012,855

(22) Filed: Feb. 2, 2016

(65) Prior Publication Data

US 2017/0217082 A1    Aug. 3, 2017

(51) Int. Cl.
| | | |
|---|---|---|
| *B29C 59/18* | (2006.01) | |
| *B29C 59/02* | (2006.01) | |
| *B29K 83/00* | (2006.01) | |
| *B29L 31/00* | (2006.01) | |

(52) U.S. Cl.
CPC ............ *B29C 59/18* (2013.01); *B29C 59/026* (2013.01); *B29K 2083/00* (2013.01); *B29L 2031/7736* (2013.01)

(58) Field of Classification Search
CPC ... B29C 59/18; B29C 59/026; B29K 2083/00; B29L 2031/7736
See application file for complete search history.

(56) References Cited

U.S. PATENT DOCUMENTS

| | | |
|---|---|---|
| 7,081,269 B2 | 7/2006 | Yang et al. |
| 7,195,733 B2 | 3/2007 | Rogers et al. |
| 7,978,416 B2 | 7/2011 | Crosby et al. |
| 8,372,230 B2 | 2/2013 | Yang et al. |
| 8,636,937 B2 | 1/2014 | Zhang et al. |
| 8,834,146 B2 | 9/2014 | Saha et al. |
| 8,906,284 B2 | 12/2014 | Crosby et al. |
| 2008/0026329 A1 | 1/2008 | Vaziri et al. |
| 2014/0017454 A1 | 1/2014 | Boyce et al. |
| 2014/0199518 A1 | 7/2014 | Yu et al. |
| 2015/0197058 A1 | 7/2015 | Saha et al. |
| 2015/0202821 A1* | 7/2015 | Saha ...................... B29C 55/12 425/383 |

(Continued)

OTHER PUBLICATIONS

Yasuaki Tokudome, Kazumasa Suzuki, Takuya Kitanaga & Masahide Takahashi, Hierarchical Nested Wrinkles on Silica-Polymer Hybrid Films:Stimuli-Responsive Micro Periodic Surface Architectures, Scientific Reports, Sep. 21, 2012, 2, 683, Nature Publishing Group, U.K.

(Continued)

*Primary Examiner* — Andrew J Bowman

(57) ABSTRACT

The range of stretch-tunability of sinusoidal wrinkled surfaces that are obtained by compression of supported thin films is limited by the emergence of a period-doubled mode at high compressive strains. This disclosure presents a method to suppress the emergence of the period-doubled mode at high strains. This is achieved by compressing pre-patterned supported thin films, wherein the pre-patterns are substantially similar to the natural pattern of the supported thin film system. As compared to flat thin film systems, pre-patterned thin film systems exhibit period doubling behavior at a higher compressive strain. The onset strain for emergence of period-doubling is tuned by altering the amplitude of the pre-patterns.

19 Claims, 5 Drawing Sheets

(56) References Cited

U.S. PATENT DOCUMENTS

2017/0095966 A1* 4/2017 Saha ................ B29C 55/12

OTHER PUBLICATIONS

Arnaud Chiche, Christopher M. Stafford, Joao T. Cabral, Complex Micropatterning of Periodic Structures on Elastomeric Surfaces, Soft Matter, Sep. 30, 2008, 2360-2364, The Royal Society of Chemistry, U.K.
Jian Yin, Conghua Lu, Hierarchical Surface Wrinkles Directed by Wrinkled Templates, Soft Matter, May 16, 2012, 8 (24), pp. 2528-2534, The Royal Society of Chemistry, U.K.
Yu-Cheng Chen, Alfred J. Crosby, High Aspect Ratio Wrinkles Via Substrate Prestretch, Advanced Materials, May 26, 2013, 26(32), pp. 5626-5631, Wiley-VCH, Germany.
Sk Faruque Ahmed, Geon-Ho Rho, Kwang-Ryeol Lee, Ashkan Vaziri, Myoung-Woon Moon, High aspect ratio wrinkles on a soft polymer, Soft Mailer, Aug. 16, 2010, 6(22), pp. 5709-5714, The Royal Society of Chemistry, U.K.
Fabian Brau, Hugues Vandeparre, Abbas Sabbah, Christophe Poulard, Arezki Boudaoud, Pascal Damman, Multiple-length-scale elastic instability mimics parametric resonance of nonlinear oscillators. Mature Physics, Oct. 31, 2010, 7(1), pp. 56-60, Nature Publishing Group, U.K.
Auguste, Anesia, Lihua Jin, Zhigang Suo, Ryan C. Hayward, The role of substrate pre-stretch in post-wrinkling bifurcations. Soft Matter, Jul. 21, 2014, 10(34), pp. 6520-6529, The Royal Society of Chemistry, U.K.

* cited by examiner

METHOD TO SUPPRESS PERIOD DOUBLING DURING MANUFACTURE OF MICRO AND NANO SCALE WRINKLED STRUCTURES

BACKGROUND OF THE INVENTION

This invention relates to the method for low-cost manufacture of a physical topographic pattern and more particularly to the manufacture of stretch-tunable micro and nano scale sinusoidal periodic wrinkle patterns that are generated upon compression of supported thin films.

Stretch-tenability extends the functionality of micro and nano structures by enabling the design and fabrication of active and adaptive systems that can respond to a variety of stimuli such as touch, temperature, humidity, and mechanical strain. Such active micro/nano-enabled systems have the potential to significantly impact diverse fields with direct societal benefits such as energy, water, health, and environment among others. For example, stretch-tunable structures find applications in the field of stretchable electronics, tunable optics, micro-nano fluidics, and sensing. Wrinkling of thin films is a low-cost process for fabricating such stretch-tunable structures over large areas.

Sinusoidal periodic wrinkled patterns are formed via compression of supported thin films as a result of buckling-based instabilities and the mechanism is similar to Euler buckling of beams under compressive loads. A schematic of this process is illustrated in FIG. 1. Essential elements of a system that demonstrates wrinkle formation are: (i) a film 10 that is thin relative to the base, (ii) mismatch in the elastic moduli of the film and the base 12 with the film being stiffer than the base, and (iii) loading conditions that generate in-plane compressive strain (c) in the film. In such bilayer systems, the state of pure compression becomes unstable beyond a critical strain and wrinkles 14 are formed via periodic bending of the film/base. The natural period of wrinkles ($\lambda_n$) is determined by the competing dependence of strain energy on period in the film versus in the base. For small strains, the natural period depends only on the thin film thickness and the ratio of Young's moduli of the film and the base. At large strains, the natural period can be tuned to some extent by the strain; in addition, the amplitude (A) is determined by amount of applied compressive strain. Thus, stretch-tunable micro/nano structures can be fabricated via wrinkling.

As the amplitude and the period of the wrinkles depend on strain, it is necessary to increase the feasible range of strain when high stretch-tenability is desired. The feasible range of strain is limited by the phenomenon of period doubling that occurs at high strains (FIG. 2). When the compressive strain exceeds the nominal onset strain ($\varepsilon_{2,0}$), an additional period-doubled mode 20 emerges so that the single period sinusoidal structure transitions into a two-period structure. Emergence of this complex structure at high strains is often undesirable in applications that rely on a single-period structure. Thus, there is a need to suppress the onset of period doubling during fabrication of wrinkled structures.

In the past, the strain dependence of stiffness modulus has been used to control the onset of period doubling[1,2]. In that method, period doubling is suppressed by increasing the amount of pre-stretch in the system. Such a method is limited by material selection as it relies on $2^{nd}$ order non-linear effects that arise from the dependence of material properties on strain. To overcome this material based limitation, one requires a suppression technique that does not rely on the stiffness versus strain material behavior. Herein, such a suppression technique is disclosed; this technique is based on geometric modifications to the system that can be applied either separately or in combination with the pre-stretch based method. Specifically, suppression of period doubling is achieved by performing the wrinkling process on pre-patterned surfaces instead of flat surfaces (FIG. 3). In this disclosed method, the second critical strain for onset of period doubling ($\varepsilon_{2,p}$) is controlled by changing the amplitude ($A_p$) of the pre-patterns 30. With this technique, the operating range of stretch-tunable wrinkle-based devices can be increased by a factor of at least 1.5 with a modest pre-pattern aspect ratio of 0.15 (i.e., $2A_p/\lambda_n=0.15$).

SUMMARY OF THE INVENTION

The method of suppressing period doubling during generation of wrinkled structures according to this invention comprises replacing flat bilayer systems with pre-patterned bilayers such that the pre-patterns have the same period as the equivalent flat bilayer. When such a pre-patterned bilayer is compressed, the pre-patterns persist even when the bilayer is compressed beyond the nominal onset strain for the equivalent flat bilayer ($\varepsilon_{2,0}$); i.e., no additional mode emerges even at high strains. With further compression, the pre-patterned bilayer transitions into the period-doubled mode at a strain $\varepsilon_{2,p}$ that is higher than $\varepsilon_{2,0}$. The equivalent flat bilayer is the bilayer system that is identical to the pre-patterned system in all respects, such as material properties and film thickness, except for the absence of the geometric pre-pattern. The suppression of period doubling can be tuned by controlling the amplitude of the pre-patterns; specifically, the onset strain for period doubling can be increased up to a limit by increasing the amplitude of the pre-patterns.

The method of pre-patterning bilayers during fabrication of wrinkles is not novel. However, all previous demonstrations of pre-patterning have been used exclusively to increase the complexity of the wrinkles by generating hierarchical structures; i.e., to introduce an additional mode that is distinct from the pre-patterned mode. In contrast, this invention applies the pre-patterning technique to achieve the exact opposite effect, i.e., to prevent the emergence of an additional mode. This is achieved by ensuring that the pre-pattern period matches the natural period of the equivalent flat bilayer. On doing so, the pre-pattern period persists even beyond the strain at which the equivalent flat bilayer transitions into a complex period-doubled mode. This is an unexpected result as the period doubling phenomenon is distinct from the phenomenon of hierarchical wrinkle formation. Thus, this invention provides one with an easy-to-implement technique to suppress period doubling via well-characterized pre-patterning fabrication process steps.

DESCRIPTION OF THE PREFERRED EMBODIMENT

Fabrication of wrinkled micro and nano scale structures via compression of flat bilayers is a well-developed art. One embodiment for fabrication of wrinkles has been previously disclosed in U.S. patent application Ser. No. 14/590,448 ("Biaxial tensile stage for fabricating and tuning wrinkles"). The process steps are: (i) pre-stretching a compliant base, (ii) generating a thin film on top of the stretched base, and (iii) releasing the pre-stretch in the base. In addition, the technique of pre-patterning the bilayers by using the wrinkled surfaces as molds has been previously disclosed in U.S. patent application Ser. No. 14/669,925 ("Wrinkled surfaces with tunable hierarchy and methods for the preparation thereof") and Ser. No. 14/922,146 ("Method to fabricate pre-patterned surfaces during manufacture of complex wrinkled structures"). The contents of these three applications (Ser. Nos. 14/590,448; 14/669,925; and 14/922,146) are incorporated herein by reference.

Figure 1:
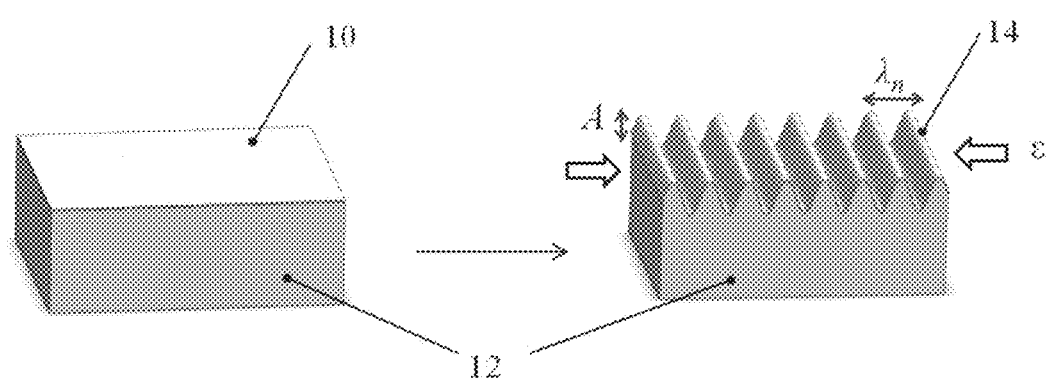
FIG. 1 is a schematic illustration of sinusoidal wrinkle formation during uniaxial compression of a flat bilayer system.
Figure 2:
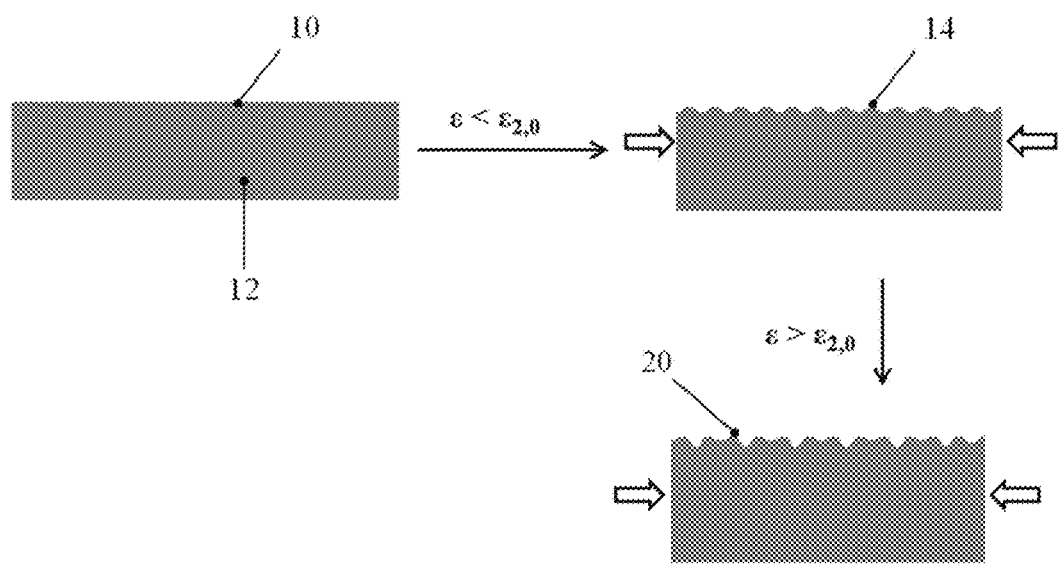
FIG. 2 is a schematic illustration of period doubling at strains during uniaxial compression of a flat bilayer system.
Figure 3:
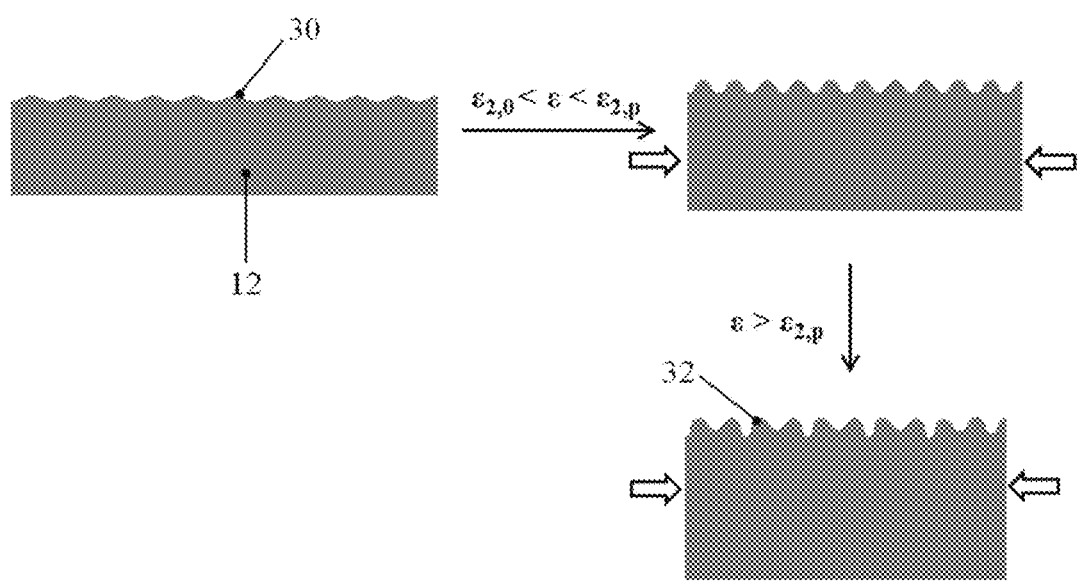
FIG. 3 is a schematic illustration of wrinkle formation and suppression of period doubling during compression of a non-flat pre-patterned bilayer system.

In one embodiment of the presently disclosed invention, period doubling at high strains is suppressed by performing a series of two wrinkle-patterning operations with an intermediate imprinting pattern transfer process between the two steps. This scheme is illustrated in FIG. 3. In the first wrinkle-patterning step one starts with a flat non-patterned bilayer system, whereas in the second wrinkle-patterning step one starts with a pre-patterned non-flat bilayer surface. The wrinkle pattern 40 obtained after the first step is utilized as a mold to generate the pre-patterned bilayer via replication.

To enable the fabrication of wrinkle patterns, one must solve these sub-problems: (i) fabrication of flat and pre-patterned bilayer systems with the desired material properties and geometry and (ii) compression of the top stiff film.

Stretchable bilayers with large stiffness ratio can be fabricated by attaching or growing a thin stiff film 10 on top of a thick elastomeric base 12. For example, exposing a polydimethylsiloxane (PDMS) film to air or oxygen plasma leads to the formation of a thin glassy layer on top of the exposed PDMS surface via oxidation. Alternatively, a metallic or polymeric thin film may be deposited on top of PDMS to obtain the desired bilayer. The top 120 layer thickness can be tuned by controlling the duration of plasma oxidation or the deposition process; whereas the stiffness ratio may be tuned by selecting the appropriate top/bottom materials. In the preferred embodiment, both plasma oxidation and metal/polymer film deposition techniques are used to generate a stiff thin film on top of an elastomeric PDMS layer.

Compression of the top film can be achieved by either directly compressing the bilayer or by generating a residual compressive strain in the top layer. As direct compression requires sustained loading to maintain the wrinkles, residual compression is often the preferred scheme. During mechanical loading, residual compression is generated by first stretching the PDMS base and then attaching/growing the stiff film on top of this pre-stretched base layer. On releasing the pre-stretch in the PDMS, the top layer undergoes compression that leads to formation of wrinkles. In the preferred embodiment of the pre-patterned bilayer, the pre-stretch is selected to be higher than the nominal period doubling onset strain for the equivalent flat bilayer.

The pre-patterned bilayers are fabricated by using the wrinkled surfaces as the molds/templates to generate the top surface of the PDMS casts 44. The curing process for fabrication of the pre-patterned base is same as that for the first wrinkling step and presented in U.S. patent application Ser. Nos. 14/669,925 and 14/922,146. Imprinting is performed by "gently" placing the pre-patterned coupon on top of the exposed surface of the curing PDMS 42 by aligning it to the direction of subsequent stretch[4]. Additionally, delayed imprinting is performed, i.e., imprinting close to, but before, the gelation point instead of at the beginning of the curing process. This ensures that the uncured PDMS is sufficiently viscous to support the pre-pattern during the curing process. One must be careful not to cross the gelation point as the phase change at this point prevents pattern replication.

To ensure that no additional modes are generated during the second wrinkling step with the pre-patterned bilayer, the following conditions must be met: (i) the period of the pre-pattern must be 'substantially similar' to the 'natural period' of the bilayer system and (ii) the pre-pattern must be aligned along the subsequent stretch direction.

Figure 4:
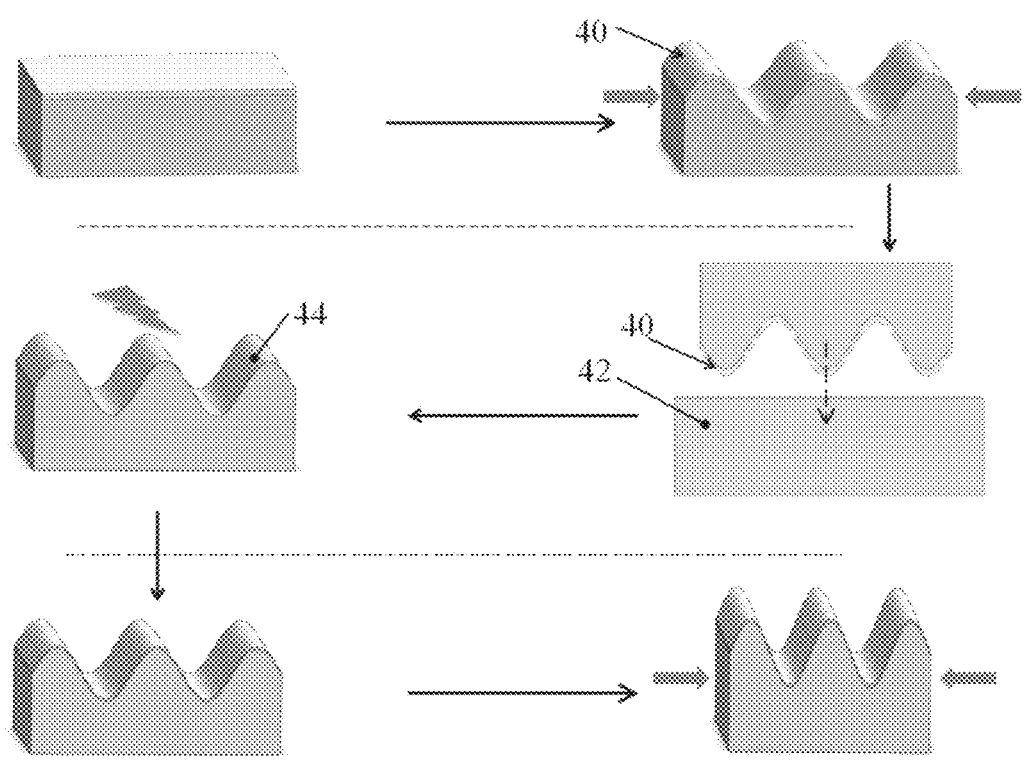
FIG. 4 is a schematic representation of the pre-patterning process based on replication of wrinkled surfaces.

Natural period: The natural period ($\lambda_n$) is the period of the pattern that is observed for an un-patterned flat bilayer system that has the same material properties as the pre-patterned bilayer system and is compressed by the same strain. The natural period of a bilayer system can be experimentally determined by eliminating the pre-pattern imprinting step from the sequence of steps shown in FIG. 4. It may also be estimated by the following relationship that is available in literature[3]: $\lambda_n = ch\eta^{1/3}$. Here, 'h' is the thickness of the thin film, '$\eta$' is the ratio of Young's moduli of the film to the base, and 'c' is a proportionality constant that depends on the Poisson's ratio of the film and the base.

Substantial similarity: A substantially similar pre-pattern is one which leads to no growth 155 of an additional mode (i.e., no mode other than the pre-patterned period) when compressed up to at least the nominal onset strain for period doubling of the equivalent flat bilayer ($\varepsilon_{2,0}$). Ideally, the pre-patterned period must be identical to the natural period. However, this condition is impossible to achieve in a practical system. When the pre-pattern period is dissimilar from the natural period, hierarchical wrinkles are expected to emerge beyond a transition strain ($\varepsilon_t$). Nevertheless, due to the phenomenon of mode lock-in, the pre-pattern persists up to the transition strain. When the pre-pattern period is 'substantially similar' to the natural period, the transition strain for hierarchy ($\varepsilon_t$) is higher than the period doubling onset strain ($\varepsilon_{2,p}$). Thus, during compression of such a 'substantially similar' bilayer one does not observe any additional modes at high strains. This 'substantial similarity' range can be easily obtained by experimental verification. A conservative estimate for this range can also be made by comparing the transition strain for hierarchy[4] ($\varepsilon_t$) with the nominal doubling onset strain for the flat bilayer ($\varepsilon_{2,0}$) as:

$$(1+2m^3-3m^2)^2 - 12k(1+2m^3) < 0 \qquad \text{Eq. (1)}$$

Here, $m = \lambda_p / \lambda_n$ and $\lambda_p$ is the period of the pre-pattern. The non-dimensional parameter 'k' is given by:

$$k = \frac{1}{\varepsilon_{2,0}} \left( \frac{\pi A_p}{\lambda_n} \right)^2 \qquad \text{Eq. (2)}$$

Here, $A_p$ is the amplitude of the pre-patterns. Pre-patterns that satisfy inequality (1) are guaranteed to be 'substantially similar'.

Figure 5:
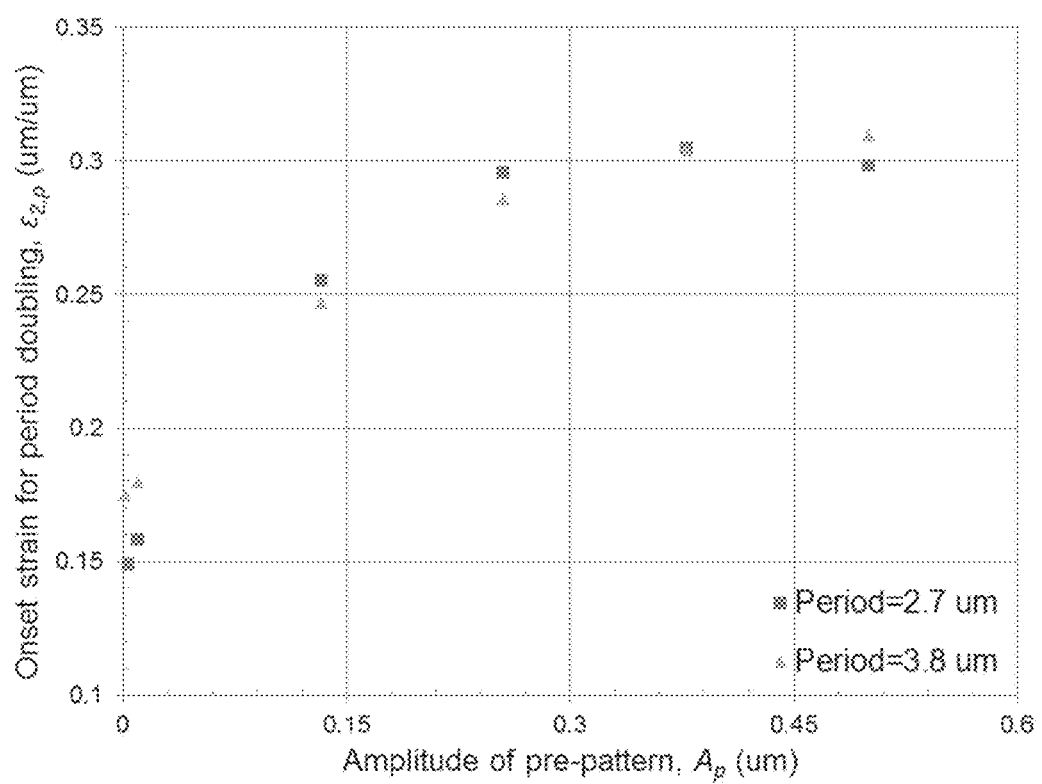
FIG. 5 illustrates finite element simulation results that demonstrate the effect of pre-pattern amplitude on the onset strain for period doubling. The pre-pattern period is identical to the natural period in these simulations.

The onset strain for period doubling ($\varepsilon_{2,p}$) can be tuned by controlling the amplitude of the pre-pattern ($A_p$). Finite element simulations were performed to verify the effect of pre-patterning on the onset strain. As shown in FIG. 5, the onset strain increases with an increase in the amplitude of the pre-patterns.

It is recognized that modifications and variations of the present invention will be apparent to those of ordinary skill in the art and it is intended that all such modifications and variations be included within the scope of the appended claims.

In one variation, the pre-patterns may be fabricated by a process other than wrinkling. In such a scheme, the manufacturing advantages of using a single fabrication process are lost. However, such a scheme may be necessary when pre-patterns are desired outside the feasible range of pre-patterns that can be fabricated via wrinkling. For example, pre-patterns may be fabricated via an alternate process when large amplitudes are desired.

In another variation, biaxial strains can be applied during the pre-stretch step and the stretch can be released in sequence along the two directions so that high-aspect ratio wrinkles are formed along the pre-patterned direction followed by buckling along the other direction. The subsequent biaxially wrinkled pattern can be stretch-tuned along the pre-patterned direction over a range that is larger than that of an equivalent flat bilayer system.

In another variation, biaxial strains can be applied during the pre-stretch step and the stretch along the two directions can be simultaneously released (at equal or unequal rate) so that a complex wrinkled pattern is formed that comprises of high-aspect ratio mode along the pre-patterned direction. This complex pattern can be stretch-tuned along the pre-patterned direction over a range that is larger than that of an equivalent flat bilayer system.

REFERENCES

1. Auguste, A., Jin, L., Suo, Z., & Hayward, R. C. (2014). The role of substrate pre-stretch in post-wrinkling bifurcations. *Soft Matter*, 10(34), 6520-6529. doi: 10.1039/C4SM01038H
2. Chen. Y.-C., & Crosby, A. J. (2014). High Aspect Ratio Wrinkles via Substrate Prestretch. Advanced Materials 26(32), 5626-5631. doi: 10.1002/adma.201401444
3. Groenewold, J. (2001). Wrinkling of plates coupled with soft elastic media. Physica A: Statistical Mechanics and its Applications 298(1-2), 32-45.
4. Saha, S. K., & Culpepper, M. L. (2014). Wrinkled Surfaces With Tunable Hierarchy and Methods for the Preparation Thereof. U.S. patent application Ser. No. 14/669,925.

What is claimed is:

1. A method of suppressing a phenomenon of period doubling at high strains during wrinkling of bilayers, comprising the steps of:
    providing a topographically patterned surface, wherein the topographic pattern is a sinusoidal periodic pattern and has a period that is substantially similar to the natural period of the bilayer;
    replicating the patterned surface onto a base substrate, thereby forming a non-flat pre-patterned surface on the base;
    stretching the pre-patterned base substrate beyond the nominal period doubling onset strain, thereby forming a stretched and pre-patterned base layer;
    generating a thin film on top of the stretched pre-patterned base layer, wherein the film conforms to the pre-patterned surface, thereby forming a composite pre-patterned material comprising a thin film on top of a stretched and pre-patterned base layer;
    releasing the strain in the stretched pre-patterned base layer of the composite material, wherein releasing the strain by an amount smaller than or larger than the nominal period doubling onset strain leads to an increase in an amplitude of the pre-patterns without emergence of a period doubled mode, thereby suppressing the phenomenon of period doubling at high strains during wrinkling.

2. The method of claim 1, wherein the base layer is stretched along a single axis.

3. The method of claim 1, wherein the direction of periodicity of the topographical periodic pattern is aligned along the direction of stretch in the base layer.

4. The method of claim 1, wherein the topographical periodic pattern is formed by the process of wrinkling of flat films, comprising the steps of:
    providing a flat non-patterned base substrate;
    stretching the base substrate, thereby forming a stretched base layer;
    generating a thin film on top of the stretched base layer, thereby forming a composite material comprising a thin film on top of a stretched base layer;
    releasing the stretch in the stretched base layer of the composite material; and
    wherein releasing the stretch causes the thin film to buckle, thereby forming a periodic wrinkled surface.

5. The method of claim 1, wherein the topographical periodic pattern is formed by the process of wrinkling of non-flat films, comprising the steps of:
    providing a non-flat pre-patterned base substrate;
    stretching the base substrate, thereby forming a stretched and pre-patterned base layer;
    generating a thin film on top of the stretched and pre-patterned base layer, wherein the film conforms to the pre-patterned surface, thereby forming a composite pre-patterned material comprising a thin film on top of a stretched and pre-patterned base layer;
    releasing the stretch in the stretched and pre-patterned base layer of the composite material; and
    wherein releasing the stretch causes the thin film to buckle, thereby forming a periodic wrinkled surface.

6. Method of claim 1, wherein the patterned surface is replicated onto the base substrate by the process of delayed and aligned imprinting, comprising the steps of:
    providing a coupon with the patterned surface, wherein the coupon has alignment features;
    providing a thermally curing base material, wherein the base material undergoes a liquid-to-solid phase transition during curing;
    providing a mold for curing the base material, wherein the mold surface has alignment features that correspond to the direction of stretch that will be applied after curing;
    heating the base material to a temperature below a threshold value to initiate the first thermal curing cycle, wherein the viscosity of the base material increases with time but the base material does not undergo a liquid-to-solid phase transition by the end of the cycle;
    aligning the coupon with the patterned surface by locating the alignment features on the coupon with respect to the alignment features on the mold, wherein the patterned surface is not yet in contact with the base material;

placing the coupon with the patterned surface on top of the base material before the end of the first thermal curing cycle;

further heating the base material to a temperature below a threshold value to initiate the second thermal curing cycle, wherein the base material undergoes a liquid-to-solid phase transition;

separating the coupon with the patterned surface from the base material after the onset of phase transition, thereby replicating the patterned surface onto the base material and generating a pre-patterned base substrate.

7. Method of claim 1, wherein the base material is polydimethylsiloxane.

8. Method of claim 1, wherein the thin film is metallic.

9. Method of claim 1, wherein the thin film is polymeric.

10. Method of claim 1, wherein the thin film is generated on top of the pre-patterned base layer by exposing the base layer to plasma.

11. Method of claim 1, wherein the thin film is generated on top of the pre-patterned base layer by depositing the material via vapor deposition process.

12. Method of claim 1, wherein the period of the pre-pattern is identical to the natural period of the composite pre-patterned material.

13. Method of claim 1, wherein the strain in the pre-patterned base layer lies in the range of 18% to 30%.

14. A method of suppressing a phenomenon of period doubling at high strains during wrinkling of bilayers, comprising the steps of:

providing a topographically patterned surface, wherein the topographic pattern is a sinusoidal periodic pattern and has a period that is substantially similar to the natural period of the bilayer;

replicating the patterned surface onto a base substrate, thereby forming a non-flat pre-patterned surface on the base;

stretching the pre-patterned base substrate along two different directions, wherein one stretch direction is aligned along a direction of periodicity of the pre-patterned surface, and wherein the strain along this aligned direction is higher than the nominal period doubling onset strain, thereby forming a stretched and pre-patterned base layer;

generating a thin film on top of the stretched pre-patterned base layer, wherein the film conforms to the pre-patterned surface, thereby forming a composite pre-patterned material comprising a thin film on top of a stretched and pre-patterned base layer;

releasing the strain along the aligned direction, wherein releasing the strain leads to an increase in an amplitude of the pre-patterns without emergence of a period doubled mode, thereby forming a high aspect ratio wrinkled surface with the same period as that of the pre-pattern;

subsequently releasing the strain along the second direction, wherein releasing the strain leads to the thin film to buckle along the second direction, thereby forming a high aspect ratio biaxially wrinkled surface.

15. Method of claim 14, wherein the period of the pre-pattern is identical to the natural period of the composite pre-patterned material.

16. Method of claim 14, wherein the strain in the pre-patterned base layer along the aligned direction lies in the range of 18% to 30%.

17. A method of suppressing a phenomenon of period doubling at high strains during wrinkling of bilayers, comprising the steps of:

providing a topographically patterned surface, wherein the topographic pattern is a sinusoidal periodic pattern and has a period that is substantially similar to the natural period of the bilayer;

replicating the patterned surface onto a base substrate, thereby forming a non-flat pre-patterned surface on the base;

stretching the pre-patterned base substrate along two different directions, wherein one stretch direction is aligned along a direction of periodicity of the pre-patterned surface, and wherein the strain along this aligned direction is higher than the nominal period doubling onset strain, thereby forming a stretched and pre-patterned base layer;

generating a thin film on top of the stretched pre-patterned base layer, wherein the film conforms to the pre-patterned surface, thereby forming a composite pre-patterned material comprising a thin film on top of a stretched and pre-patterned base layer;

simultaneously releasing the strain along both the directions, wherein releasing the strain leads to the thin film to buckle along both the directions, and wherein releasing the strain leads to an increase in an amplitude of the pre-patterns along one direction without emergence of a period doubled mode, thereby forming a high aspect ratio biaxially wrinkled surface.

18. Method of claim 17, wherein the period of the pre-pattern is identical to the natural period of the composite pre-patterned material.

19. Method of claim 17, wherein the strain along the two directions are released simultaneously but at an unequal rate along the two directions.

* * * * *